United States Patent

[11] 3,602,337

[72] Inventor Albert D. Cain
  H.H.C. 1st Sig. Bde. Telma, APO San Francisco, Calif. 96384
[21] Appl. No. 8,244
[22] Filed Feb. 3, 1970
[45] Patented Aug. 31, 1971

[54] ELASTIC DRIVE DEVICE
  9 Claims, 8 Drawing Figs.
[52] U.S. Cl. ................................................ 185/9,
  185/10, 185/37, 185/45, 185/DIG. 1
[51] Int. Cl. ................................................ F03g 1/00
[50] Field of Search ................................ 185/9, 10, 37, 39, 45, DIG. 1

[56] References Cited
UNITED STATES PATENTS
| | | | |
|---|---|---|---|
| 1,936,072 | 11/1933 | Roderick | 185/37 |
| 2,028,845 | 1/1936 | Reid | 185/37 |
| 2,200,686 | 5/1940 | Beckman | 185/9 |
| 2,461,784 | 2/1949 | Streed | 185/37 |
| 2,477,421 | 7/1949 | Roderick | 185/37 |
| 3,179,207 | 4/1965 | Sutherland | 185/9 |

FOREIGN PATENTS
| | | | |
|---|---|---|---|
| 385,012 | 12/1932 | Great Britain | 185/9 |

*Primary Examiner*—Edgar W. Geoghegan
*Attorneys*—William D. Hall, Elliott I. Pollock, Fred C. Philpitt, George Vande Sande, Charles F. Steininger and Robert R. Priddy

ABSTRACT: The specification discloses an elastic drive device having a plurality of elastic bands that are coupled together through transmission means to increase the longevity of the power output when the stored energy is released. The specification also discloses a two-stage elastic band drive system wherein the first stage generates higher power and higher r.p.m. than the second stage.

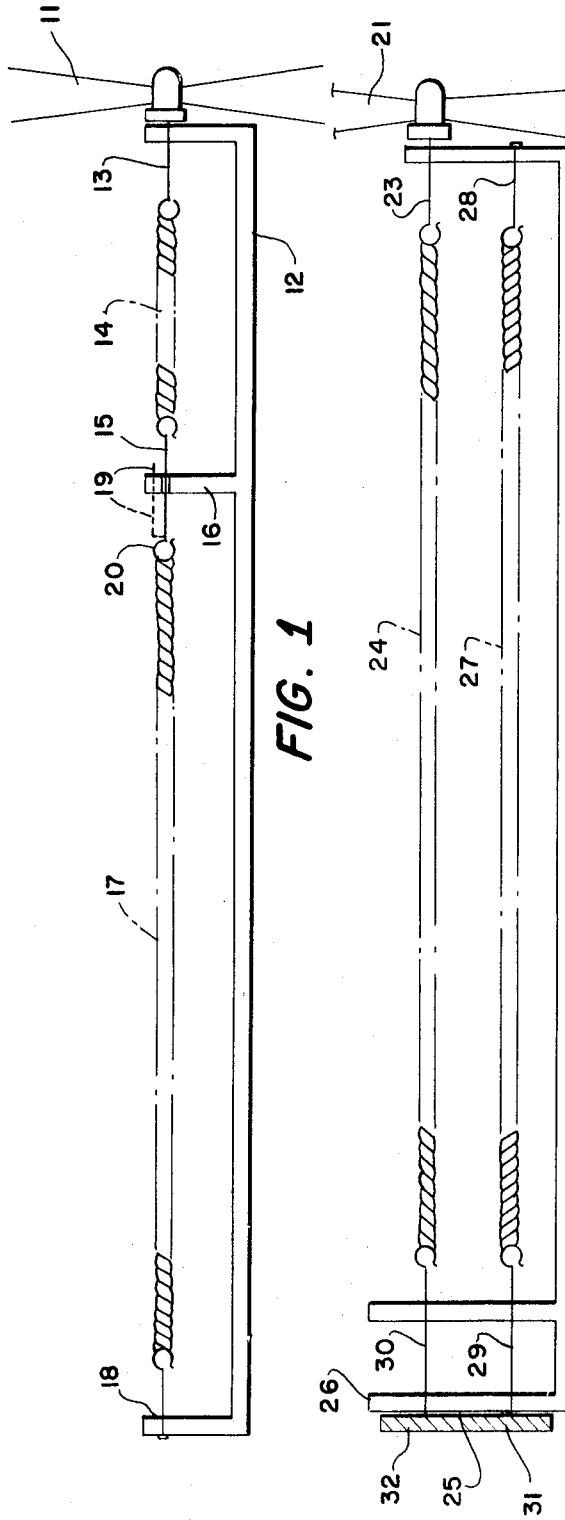

INVENTOR
ALBERT D. CAIN
BY
ATTORNEYS 3,602,337

ELASTIC DRIVE DEVICE

BRIEF SUMMARY OF THE INVENTION

Prior art model airplanes have for many years employed a resilient band motor or drive means to energize the propeller wherein the propeller is wound before flight several hundred turns and released when the model airplane is launched to provide a resilient drive means for rotating the propeller for a short time.

Generally speaking, the longer the elastic band employed, the longer the running time of the elastic band drive means. This, however, very quickly becomes a problem in model aircraft for to double the running time of a ten inch elastic band would require that the fuselage be doubled to 20 inches which would greatly increase the cost and complexity of the model airplane.

Another problem presented is that when the elastic band is tightly wound, the airplane will accelerate out in its initial stages of flight to gain altitude and once the altitude is reached will continue to expend its energy at the same rate so that for all practical purposes the airplane's powered flight is at maximum power, and the bulk of the flight is unpowered because the energy from the rubber resilient band drive means was expended during the climbing and initial portions of the flight.

It should be noted that the foregoing are equally applicable to any model device whether it be boat, car, or erector set which employs a resilient band drive means.

OBJECTS OF THE INVENTION

It is therefore an objection of this invention to provide an automatic, double elastic band device to greatly increase the running time of an elastic band drive means.

It is another object of this invention to provide an elastic band motor utilizing a plurality of rubber elastic bands operatively connected together through a plurality of transmission means to greatly increase the running time of the motor.

It is another object of this device to provide a two-stage resilient band motor with an initial high power output stage and a second lower, longer running, output stage.

It is another object of this invention to provide a multistage resilient band device with a timing means to release the energy of at least one of the resilient bands at a predetermined interval after the release of the model.

DETAILED DESCRIPTION OF THE DRAWINGS

FIG. 1 is a side view of my automatic two-stage resilient band device having a first high powered section and a second lower powered, longer running section.

FIG. 2 is a side view of one embodiment of my invention utilizing a transmission coupling means between the first and second elastic bands.

FIG. 3 is a side view of another embodiment of my invention, having a first and second drive means, a timing means, and a transmission means.

FIG. 4 is a front view of my first additional transmission means.

FIG. 5 is a front view of my second additional transmission means.

IN THE SPECIFICATION

Figure 6:
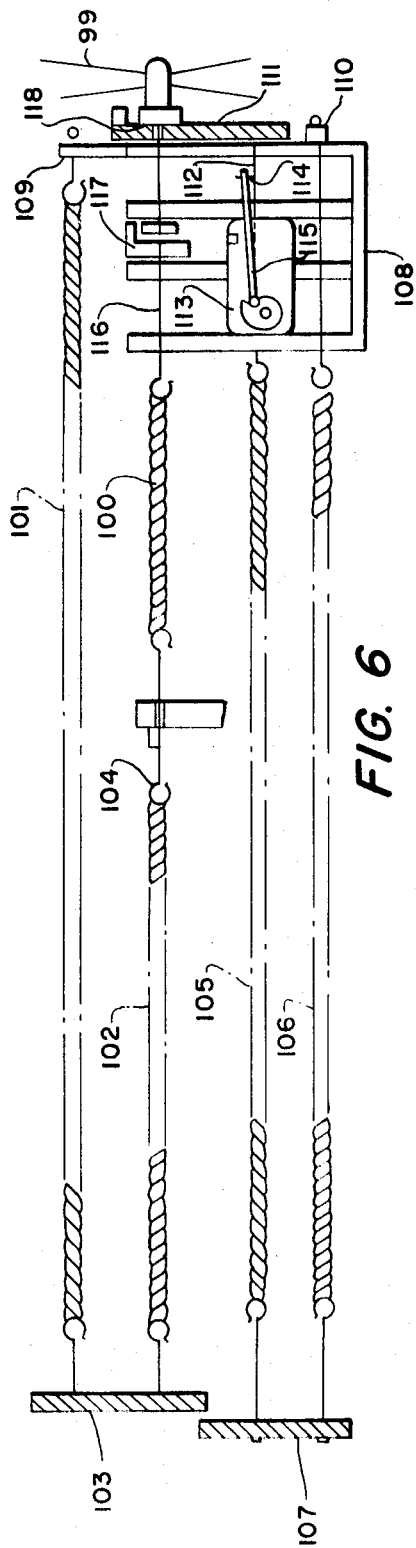
FIG. 6 is another embodiment of my invention utilizing a plurality of drive means, a plurality of transmission means, timing means, and latch means.

Referring to FIG. 1, propeller 11 is journaled for rotation in frame 12 by means of output shaft 13. The first elastic band drive means 14 is connected to the output drive shaft 13 at its first end and coupling means 15 at its second end. The coupling means 15 is journaled for rotation in intermediate support member 16 and the coupling means is connected to the second elastic band 17 at its second end. Elastic band 17 is removably fitted for nonrotation to frame 12 by means of fitting 18.

Coupling means 15 is also provided with a rotating abutment 19 which is illustrated in an abutting relationship with intermediate support member 16. When the elastic band drive means is fully wound as illustrated in FIG. 1, the tension exerted by the first elastic band 14 holds coupling member 15 in its forward position as illustrated in FIG. 1. As elastic band 14 begins to unwind while driving propeller 11, the tension exerted by the second elastic band 17 will draw the coupling means 15 rearward to the position illustrated by the dotted lines in FIG. 1. Once the rotating abutment 19 has cleared the intermediate support member 16, then the second elastic band will drive the first elastic band by means of coupling 15 to assist in rotating the propeller 11.

In this embodiment, a heavy, short, and high tension elastic band is desired for the first elastic band 14, with a longer, thinner, and more resilient elastic band desired for band 17. This enables the operator to have a first and second power stage, wherein the first stage is driven by elastic band 14 at a very high rate with great power. This will assist in powering the model aircraft to its operating altitude with a high r.p.m. burst of energy. Once the aircraft has achieved its operating altitude and the first elastic band 14 has released much of its energy, the coupling means 15 will be drawn rearwards and the longer running, lower powered second drive means 17 will then begin to drive the propeller 11 through coupling means 15 and band 14 to provide a much longer extended period of flight at a lower power.

FIG. 2 illustrates another embodiment of my invention wherein a double elastic band drive means is utilized to double the running time of the aircraft.

Propeller 21 is journaled for rotation in frame 22 by means of output drive shaft 23. A first elastic band is connected at its first end to output shaft 23 and at its second end to transmission coupling means 25. The transmission coupling means is mounted in frame 26, and is connected to the first end of a second elastic band 27 with the second end of the elastic band being removably attached for nonrotation to frame 22 by means of fitting 28. The transmission coupling means 25 is comprised of drive shafts 29 and 30 and spur gears 31 and 32, with spur gear 31 being journaled for rotation in support member 26 by means of shaft 29, and spur gear 32 being journaled for rotation in support member 26 by means of shaft 30. Thus, it can be readily seen that the effective running length of the elastic band has been doubled by the utilization of two elastic bands 24 and 27.

This configuration enables the operator to double the running time of the aircraft without doubling the length of the fuselage. Although the running time of an elastic band is somewhat dependent on the resiliency and thickness of the rubber bands employed, it is primarily dependent upon the length of band. A thicker, high tension elastic band will provide a high power output and short running time while a thinner, more resilient band provides a longer output but lower power. This configuration enables the operator to use a thicker, more powerful band than would normally be employed, but yet virtually double the running time of a single elastic band drive device. If the fuselage length of a normal model were doubled, the cost and complexity of the model aircraft would be more than doubled. Also, in many aircraft the configuration of the fuselage is critical sine the model represents a particular type of aircraft that has been flown in the past. With this embodiment, it is therefore possible to have an accurate configuration of the fuselage and still increase the running time of the model when the model is used in powered flights.

FIG. 3 is another embodiment of my invention which enables the operator to utilize the advantages inherent in the embodiment of disclosed in FIG. 1 and in FIG. 2.

Propeller 31 is journaled for rotation in frame 33 by means of a first additional transmission means 32 mounted on output shaft 34. The input side of the drive shaft 34 is connected to a second additional transmission means generally designated as 37 which is, in turn, connected to intermediate drive shaft 40. Drive shaft 40 is journaled for rotation in intermediate support member 41 and is connected to the first elastic band 42 at its first end. The second end of elastic band 42 is removably affixed for nonrotation to frame 32 by means of fitting 43. Elastic band 44 is removably attached for nonrotation to frame 32 at its first end by means of fitting 45, and is connected to its second end to the timing means and transmission means 46 by means of shaft 47. A rotating abutment 48 is carried on shaft 47 which is restricted in movement by reciprocating member 49 which is connected to timer 50.

Figure 7:
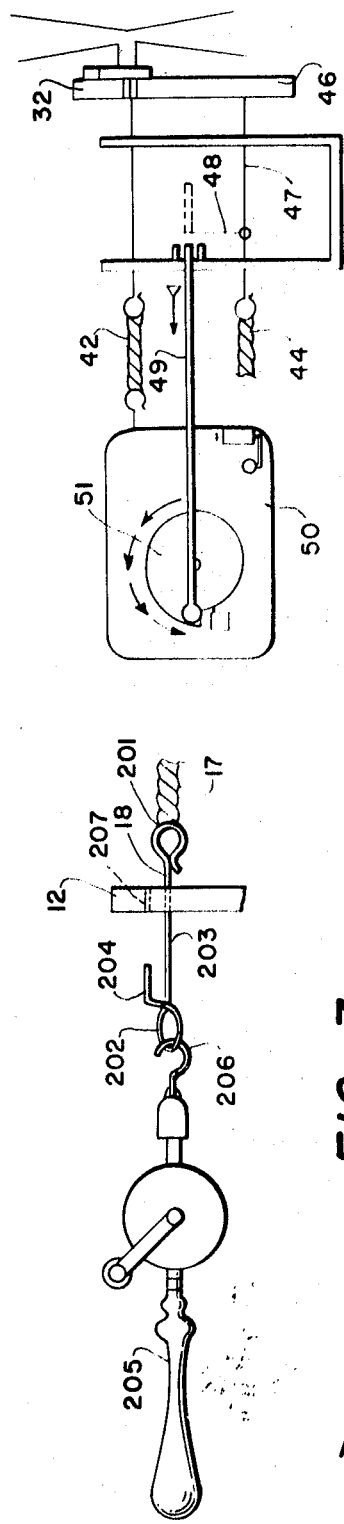
FIG. 7 is an enlarged end view of the embodiment disclosed in FIG. 1 and further illustrates the manner in which the drive means are wound.

In the embodiment illustrated in FIG. 3, it is necessary to prepare the aircraft for flight by winding the elastic bands 42 and 44 from the rear by means of fittings 43 and 46 which will be further illustrated and discussed with respect to FIG. 7.

The first additional transmission means is illustrated in FIG. 4, with the second additional transmission means illustrated in FIG. 5. These two transmission means are utilized in a tandem relationship since they transmit power in one direction only, being capable of free rotation in the other direction. This enables the output of elastic band 42 to power the airplane propeller through the second additional transmission means as illustrated in FIG. 5 and output shaft 34, and enables the elastic band 44 to power the aircraft after the timing means has disengaged rotating abutment 48 by rotating the transmission means 46 to energize the first additional transmission means 32.

In operation, when the propeller 31 is released, it will be powered by shaft 34 which is journaled through the first additional transmission means 32 and is directly coupled to the intermediate drive shaft 40 by means of the second additional transmission means illustrated in FIG. 5. This transmission means comprises a first rotating member 35 which carries a spring-loaded dog 39. The second member 36 is fixedly attached to shaft 34 and defines catch 60. Thus, when the elastic band 42 begins to unwind and rotate shaft 40, the spring-loaded dog 39 is firmly held for nonrotation by catch 60 which, in turn, rotates the second rotary member 36 and shaft 34 to power propeller 31.

The second elastic band 44 is held in place for nonrotation by means of rotating abutment 48 which is mounted on drive shaft 47. The reciprocating member 49 is connected to timing means 50 by means of crank arm 51.

Figure 8:
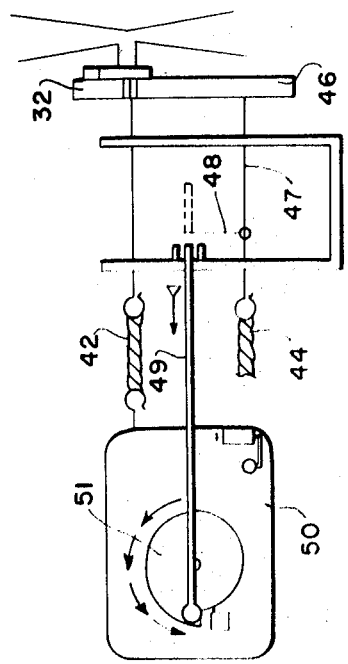
FIG. 8 is an enlarged view of the timing means utilized in my invention.

FIG. 8 is an enlarged illustration of the timing means utilized in the third and fourth embodiments of my invention and illustrates the transmission means 46, the first additional transmission means 32, and the timing means. Timer 50 is a conventional timer that is often utilized in the model aircraft industry to shut off the fuel supply to an internal combustion engine after a predetermined interval has elapsed. In this instance, it is fitted with rotating crank arm 51 and reciprocating member 49 to provide an abutment for the rotating abutment 48. After a predetermined interval has elapsed, the reciprocating member 49 is withdrawn and the rotating abutment 48 is then free to rotate an the energy stored in elastic band 44 is then supplied to transmission means 46. Transmission means 46 is comprised of two spur gears journaled for rotation in frame 33 by means of shafts 34 and 47. As the energy from the second elastic band 44 begins to power the transmission means 46, it drives the outer member of the first additional transmission means 32. This first additional transmission means is illustrated in FIG. 4 and comprises the large spur gear 56 which meshes with the lower spur gear 46A and turns in the opposite direction as does shaft 47. The smaller rotating member 52 is permanently attached to propeller 31 and defines a notch 54 which is engaged by the spring-loaded dog 53 mounted on the spur gear 56. In this manner, spur gear 56 is allowed to drive the propeller 31 at this time.

The first and second additional transmission means are necessary to prevent the rotating abutment 48 from locking the propeller in one position via means of spur gears 56 and 46A. Additionally, once the second drive means 44 begins to power spur gear 46, it is highly desirable that the energy be coupled directly to the propeller 31 and not be fed back through drive shaft 34 to rewind the first resilient band 42 in the opposite direction. Thus, the first and second additional transmission means which supply power in one direction only and provide for free rotation in the other direction enable the operator to use the first elastic bands 42 to power the aircraft into the air, and select a predetermined interval at which the second elastic band 44 will begin to energize the propeller 31. In this manner, it is possible to select a high-energy, high r.p.m. elastic band for the first member 42, and a longer-running, lower-powered elastic band for the second member 44. Thus, the operator can double the length of the running time and provide for a high-power, high r.p.m. climbing portion and for a longer-running, lower-powered flight portion that will begin after a predetermined interval has elapsed.

Referring now to FIG. 6, the fourth embodiment of my invention combines all of the features heretofore discussed and described in FIGS. 1, 2 and 3. A plurality of elastic bands 100, 101, 102, 105 and 106 are connected together by means of coupling means 103, 104, 107 and transmission means 111 to drive the propeller 99.

In operation, the elastic band 106 is removably fixed for nonrotation at its first end by means of fitting 110 which is journaled in frame 108. This fitting 110 is utilized to wind the elastic bands 105 and 106 prior to flight. The second end of an elastic band 106 is connected to transmission coupling means 107 which is, in turn, connected to the elastic band 105. Elastic band 105 is coupled via shaft 112 to transmission means 111 but is restricted in operation by means of rotating abutment 114 and reciprocating member 115 which is connected to timer 113. The operation of the timer, reciprocating arm and rotating abutment is identical to the operation disclosed with regard to FIGS. 3 and 4.

Elastic bands 100 and 102 are connected together by means of coupling means 104 and operate as described with regard to FIG. 1. The combined elastic bands 101 and 102 are connected together and combine with elastic band 102 to operate in the manner illustrated with respect to FIG. 2. The output of elastic band 100 is supplied to shaft 116 which operates through the second additional transmission means 117 to power the propeller 99. The first additional transmission means 118 is utilized to prevent the rotating abutment 114 from locking propeller 99 in place while the upper stages of the elastic band drive device are powering the propeller. In this embodiment, it is seen that high energy, high r.p.m., high output elastic band 100 may be used to power the flight during the initial takeoff stages, with elastic bands 101 and 102 providing second and third stages of reduced power output or simply increased running time once the aircraft is airborne. After a predetermined interval has elapsed, timer 113 will retract the reciprocating member 115 to allow the elastic bands 105 and 106 to energize transmission 111 to thereby rotate the propeller 99. The second additional transmission means 117 is then used to prevent the elastic bands 105 and 106 from rewinding elastic bands 100, 101 and 102 and to direct all of the available energy to the propeller 99. If desired, two different types of power output can be utilized in elastic bands 105 and 106; however, it is intended that they will be used as the longer-running, lower-powered type of drive means to sustain the aircraft once it has achieved its operating altitude.

FIG. 7 is an illustration of the fitting utilized to wind or energize the elastic band from the rear of the aircraft. Elastic band 17 is removably fitted for nonrotation to fitting 18 which is journaled in support frame 12. Fitting 18 has two hook members 201 and 202 disposed on each end of the central shaft 203. An abutting or engaging arm 204 is fixably attached to the central shaft 203 and may be formed from the single length of wire by crossing the main shaft to create hook 202. When winding the elastic bands, the geared rubber winder 205 is hooked into hook 202 by means of hook drive 206 and the fitting 18 is then drawn rearwardly, withdrawing the engaging or abutting arm 204 from the support frame 12. It should be understood that the engagement may be in the form of a driller hole as illustrated in FIG. 7 at 207 or if support member 12 is of a rather narrow stature, the rotating abutment 204 will be held firmly in place by the side lateral surface of frame member 12.

After the fitting 18 has been drawn rearwardly to disengage the abutting arm 204, the elastic band 17 is wound by means of the conventional geared rubber winder 205. Once the proper number of turns have been achieved, the tension exerted by the elastic band 17 will draw the fitting 18 forward until engaging member 204 is seated securely in hole opening 207.

While the present invention has been described with reference to four specific embodiments having a plurality of elastic band drive means, it will be obvious to those skilled in the art that the various combinations may be interchanged in various manners to provide other combinations of drive means and transmission means. It should be noted that the embodiments illustrated are presented by way of example only, and not in any limiting sense. The invention, in brief, comprises all of the embodiments and modifications coming within the scope and spirit of the following claims.

What I claim is new and desire to secure by Letters Patent is:

1. An elastic drive device comprising
   a. a frame,
   b. a first elastic drive means mounted in said frame, with a first end operatively connected to an output drive shaft, and a second end connected to a coupling means,
   c. a second elastic drive means mounted in said frame, with a first end connected to said coupling means, and a second end removably attached for nonrotation to said frame,
   d. whereby stored elastic energy may be released from said second elastic drive means through said coupling means to said first elastic drive means to thereby rotate said output shaft.

2. An elastic drive device as claimed in claim 1, wherein said coupling means further comprises latch means which prevent the release of stored elastic energy in said second drive means until the energy stored in said first elastic drive means has been partially released.

3. An elastic drive device as claimed in claim 1, where said coupling means further comprise transmission means to directly couple the output of said second drive means to said first drive means.

4. An elastic drive device as claimed in claim 2 which further comprises an intermediate support member mounted on said frame with said coupling means extending therethrough, said coupling means further defining a projection which abuts against said support member when said first elastic drive means is fully wound to prevent the release of energy stored in said second elastic drive means until the energy stored in said first drive means is partially released.

5. An elastic drive device as defined in claim 3 wherein said transmission means further comprise a pair of spur gears mounted for rotation on said frame to directly couple the output of said second drive means to said first drive means.

6. An elastic drive device as claimed in claim 1 which further comprises a third elastic drive means mounted between said first and second drive means, and a second coupling means mounted between said second and third drive means to transmit stored elastic energy from said second drive means to said third drive means, whereby the consecutively released energy of said second drive means and said third drive means is released to said first drive means after said latch means is disengaged.

7. An elastic drive means comprising:
   a. a frame, said frame having a transmission means and output shaft mounted thereon,
   b. a first elastic drive means mounted in said frame, with a first end operably connected to a transmission means, and a second end removably attached for nonrotation to said frame,
   c. a second elastic drive means mounted in said frame, with a first end operably connected to said transmission means, and a second end removably attached for nonrotation to said frame,
   d. a third elastic drive means mounted within said frame with a first end operatively connected to said transmission means, and a second end connected to a coupling means,
   e. a fourth elastic drive means mounted within said frame with a first end connected to said coupling means and a second end removably attached for nonrotation to said frame whereby the stored elastic energy of said third and fourth elastic drive means may be transmitted through said transmission means to said output shaft.

8. An elastic drive device as claimed in claim 7 which further comprises timing means mounted within said transmission means to prevent the transmission of stored elastic energy in said second elastic drive means until a predetermined time interval has elapsed, after which stored elastic energy may be released from said second drive means through said transmission means to said output shaft.

9. An elastic drive device as claimed in claim 7, wherein said drive means further comprise a rotating abutment mounted within said transmission means, a reciprocal member also mounted within said transmission means to engage said rotating abutment and thereby prevent its rotation until said reciprocating member is withdrawn into a nonabutting relationship by a timing means.